United States Patent
Jiang et al.

(10) Patent No.: US 11,438,112 B2
(45) Date of Patent: Sep. 6, 2022

(54) REFERENCE SIGNAL TRANSMISSION METHOD AND DEVICE

(71) Applicant: ZTE CORPORATION, Guangdong (CN)

(72) Inventors: Chuangxin Jiang, Guangdong (CN); Yu Ngok Li, Guangdong (CN); Yijian Chen, Guangdong (CN); Zhaohua Lu, Guangdong (CN); Meng Mei, Guangdong (CN); Feiming Wang, Guangdong (CN); Shujuan Zhang, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 79 days.

(21) Appl. No.: 16/761,015

(22) PCT Filed: Nov. 2, 2018

(86) PCT No.: PCT/CN2018/113705
§ 371 (c)(1),
(2) Date: May 1, 2020

(87) PCT Pub. No.: WO2019/085998
PCT Pub. Date: May 9, 2019

(65) Prior Publication Data
US 2021/0044400 A1    Feb. 11, 2021

(30) Foreign Application Priority Data
Nov. 3, 2017 (CN) .......................... 201711071459.0

(51) Int. Cl.
*H04W 4/00* (2018.01)
*H04L 5/00* (2006.01)

(52) U.S. Cl.
CPC .......... *H04L 5/0048* (2013.01); *H04L 5/0053* (2013.01)

(58) Field of Classification Search
CPC ... H04L 5/0048; H04L 5/0051; H04L 5/0053; H04B 7/063; H04B 7/0639; H04W 72/042

(Continued)

(56) References Cited

U.S. PATENT DOCUMENTS

2013/0265962 A1* 10/2013 Ouchi ................... H04W 72/02 370/329
2020/0351127 A1* 11/2020 Yokomakura ......... H04W 80/08
2020/0366429 A1* 11/2020 Huang ................. H04B 7/0456

FOREIGN PATENT DOCUMENTS

CN    102076026 A    5/2011
CN    102404854 A    4/2012

(Continued)

OTHER PUBLICATIONS

R1-1719185 (WF on Multiple SRI & SRS Resource Transmission, Ericsson, ZTE, Sanechips, Huawei, HiSilicon, Intel, MediaTek, Samsung, CATT, Nokia, NSB, 3GPP TSG RAN WG1 Meeting 90bis Prague, Czech Republic, Oct. 9-13, 2017) (Year: 2017).*

(Continued)

*Primary Examiner* — Maharishi V Khirodhar
(74) *Attorney, Agent, or Firm* — KDB Firm PLLC (57) ABSTRACT

The reference signal transmission method includes: using at least one of the following information indication bit to configure the indication information of the reference signal to be transmitted and transmitting the reference signal: port information of the demodulated reference signal (DMRS), port correspondence information of the phase tracking reference signal (PTRS), code block group (CBG) related notification information, and SRS resource indicator (SRI)

(Continued)

information, precoding matrix indicator (TPMI) information, or transmission layer number indicator (TRI) information.

Figure accompanying the abstract: FIG. 5

5 Claims, 4 Drawing Sheets

(58) Field of Classification Search
USPC .......................................................... 370/329
See application file for complete search history.

(56) References Cited

FOREIGN PATENT DOCUMENTS

| | | | | | |
|---|---|---|---|---|---|
| CN | 103944665 | A | | 7/2014 | |
| CN | 106160970 | A | | 11/2016 | |
| CN | 106162890 | A | | 11/2016 | |
| CN | 108111283 | A | | 6/2018 | |
| CN | 109600794 | A | * | 4/2019 | ............ H04W 72/04 |
| JP | 2017-172867 | | * | 9/2017 | |
| JP | 2019050472 | A | * | 3/2019 | ........... H04L 5/0048 |
| WO | 2011095062 | A1 | | 8/2011 | |
| WO | 2012048629 | A1 | | 4/2012 | |

OTHER PUBLICATIONS

NTT Docomo, Inc. "Work plan for Rel-15 NR WI" 3GPP TSG RAN WG1 Meeting #90 R1-1713892, Prague, Czech Republic, Aug. 21-25, 2017, 103 pages.

Search Report for Chinese Patent Application No. 2017110714590, dated Apr. 1, 2021, 2 pages.

Office Action for Chinese Patent Application No. 2017110714590, dated Apr. 1, 2021, 5 pages.

Vivo, "Discussion on PT-RS" 3GPP TSG RAN WG1 Meeting #90, Prague, P.R. Czech, Aug. 21-25, 2017—R1-1712843, 3 pages.

Indian Office Action for the Patent Application No. 202027023197, dated Jul. 31, 2021, 6 pages.

International Search Report for the International Patent Application No. PCT/CN2018/113705, dated Feb. 2, 2019, 2 pages.

ZTE et al. "3GPP TSG RAN WG1 Meeting AH 1801, R1-1800132" Remaining issues on DCI content, 2018, Jan. 26, 2018.

\* cited by examiner

REFERENCE SIGNAL TRANSMISSION METHOD AND DEVICE

CROSS-REFERENCE TO RELATED APPLICATIONS

This is a National Stage Application, filed under 35 U.S.C. 371, of International Patent Application No. PCT/CN2018/113705, filed on Nov. 2, 2018, which claims priority to a Chinese patent application No. 201711071459.0 filed with CNIPA on Nov. 3, 2017, contents of both of which are incorporated herein by reference in their entireties.

TECHNICAL FIELD

The present disclosure relates to a technical field of New Radio (NR), for example, to a reference signal transmission method and device.

BACKGROUND

Physical layer technologies of NR are currently being discussed in the 3rd generation partnership project (3GPP) radio access network (RAN). Flexibility and high efficiency are the goal pursued by NR physical layer design. Pursuing the maximum flexibility of the physical layer reference signal also seems to be a trend. This is because the requirements for demodulated reference signals may be different in different application scenarios. In addition, NR supports transmission of data at high frequencies, so multi-antenna beamforming technology is introduced for huge path loss and other losses at high frequencies, such as fading caused by rain attenuation or vegetation absorption. Beamforming technology at high frequencies may be classified into digital beamforming, analog beamforming, and hybrid digital and analog beams. Since the digital beamforming technology requires the transmitter to have a better understanding of the channel state, that is, it is required to know the channel information of each antenna port, and a huge overhead of the reference signal. Therefore, the analog beamforming has received extensive attention. The beamforming method may be implemented at the transmitter and also at the receiver. For example, a base station may use different transmit beams to send data to a user, and the user may also use different receive beams to receive data.

In order to achieve flexibility, NR has agreed on two types of demodulated reference signal (DMRS). If only front loaded DMRS is configured, the number of DMRS time domain symbols may be one or two. A first DMRS type is a DMRS pattern based on interleaved frequency domain multiplexing (IFDM), which is called DMRS type 1. The DMRS type 1 can effectively support a maximum of 4 ports in one DMRS symbol and a maximum of 8 ports in 2 adjacent DMRS symbols. A second DMRS type is a DMRS pattern based on frequency domain orthogonal covering code (FD-OCC), which is called DMRS type 2. The DMRS type 2 can effectively support a maximum of 6 ports in one DMRS symbol and a maximum of 12 ports in 2 adjacent DMRS symbols. Furthermore, at high frequencies, a phase tracking reference signal (PTRS) may be introduced to estimate phase noise. This is because at high frequencies, the presence of the phase noise will cause the estimation accuracy of the demodulated reference signal in the time domain to be greatly reduced, and thereby system transmission efficiency is reduced.

Generally, since a crystal oscillator is used for an antenna panel of a transmit-receive point (TRP), multiple DMRS ports from the antenna panel may share one PTRS port, that is, the estimated result of the PTRS port may be used for multiple DMRS ports. However, for uplink scheduling, if the base station needs to use downlink control information (DCI) to notify the port correspondence between PTRS and DMRS, the overhead of DCI will be large.

SUMMARY

The present disclosure provides a reference signal transmission method and device.

The present disclosure provides a reference signal transmission method, and the method includes following steps.

Indication information of a reference signal to be transmitted is configured, and the reference signal is transmitted by using an indication bit of at least one of following information: port information of a DMRS, port correspondence information of a PTRS, code block group (CBG) related notification information, sounding reference signal (SRS) resource indicator (also known as SRI) information, precoding matrix indicator (TPMI) information, or transmit rank indicator (TRI) information.

The present disclosure provides a reference signal transmission method, and the method includes following steps.

Port correspondence information of a PTRS is transmitted by using 1-bit DCI signaling, where the PTRS is configured to correspond to one of first two ports in multiple DMRS ports, or the PTRS is configured to correspond to one of first two data layers of multiple data layers in TPMI.

The present disclosure also provides a device configured to implement the above mentioned reference signal transmission method.

The present disclosure further provides a computer readable storage medium configured to store computer-executable instructions for implementing the above mentioned reference signal transmission method.

DETAILED DESCRIPTION

The DMRS design in NR is symmetrical, especially for multi-carrier orthogonal frequency division multiplexing (OFDM) systems (cyclic prefix-orthogonal frequency division multiplexing, CP-OFDM). Long Term Evolution (LTE) CP-OFDM system is used for downlink in NR, while LTE single-carrier system (discrete Fourier transform-spread-OFDM, DFT-S-OFDM) is used for uplink, CP-OFDM system is also introduced. Since the CP-OFDM system is used for both uplink and downlink, symmetrical reference signal (RS) pattern design is helpful to simplify the standard.

Figure 1:
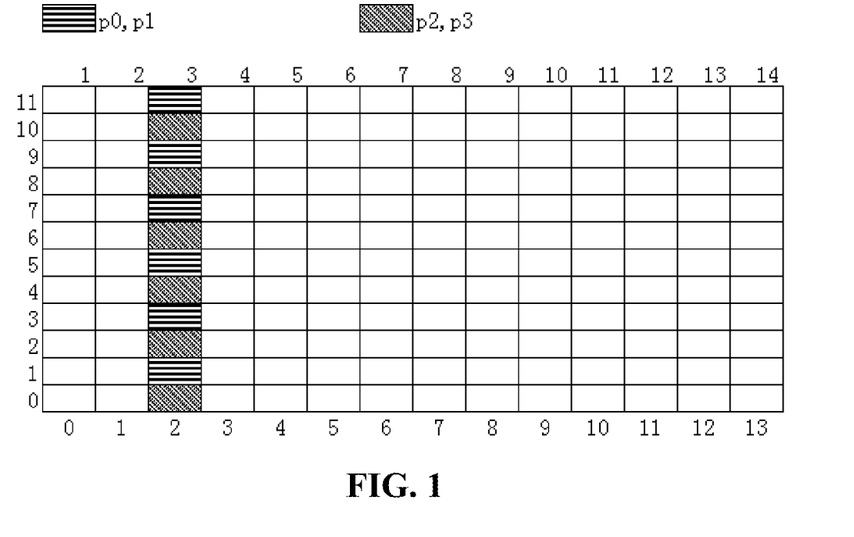
FIG. 1 is a schematic diagram of a correspondence of one DMRS time domain symbol in a demodulated reference signal type 1 according to an embodiment.

FIG. 1 is a schematic diagram of a correspondence of one DMRS time domain symbol in a demodulated reference signal type 1 according to an embodiment. In FIG. 1, the DMRS port is divided into two code division multiplexing (CDM) groups. CDM group #0 includes p0 and p1, and p0 and p1 occupy a same time-frequency resource, and are distinguished from each other by different codes, for example, different cyclic shifts (CSs) or overlapping cover code (OCC) sequences. CDM group #1 includes p2 and p3, and p2 and p3 occupy a same time-frequency resource and are distinguished from each other by different codes.

Figure 2:
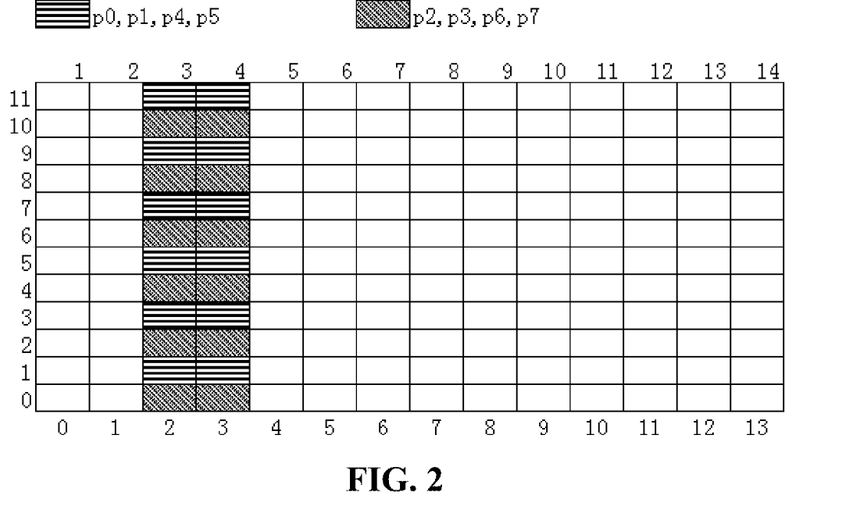
FIG. 2 is a schematic diagram of a correspondence of two DMRS time domain symbols in a demodulated reference signal type 1 according to an embodiment.

FIG. 2 is a schematic diagram of a correspondence of two DMRS time domain symbols in a demodulated reference signal type 2 according to an embodiment. In FIG. 2, 8 ports are divided into 2 CDM groups. CDM group #0 includes p0, p1, p4 and p5, and p0, p1, p4 and p5 occupy a same time-frequency resource. Different codes are used for p0 and p1 in the frequency domain. For example, p0 uses CS sequence 0 and p1 uses CS sequence 1. Different codes are used for p4 and p5 in the frequency domain. However, the OCC codes used for p0 and p1 in the time domain are the same, the OCC codes used for p4 and p5 in the time domain are also the same, and the OCC codes used for p4 and p5 in the time domain are different from the OCC codes used for p0 and p1 in the time domain. Similarly, CDM group #1 includes ports p2, p3, p6 and p7, and p2 and p3 use different CSs in the frequency domain, and use a same OCC code in the time domain; p6 and p7 use different CSs in the frequency domain and a same OCC code in the time domain, and the OCC code used for p6 and p7 is different from the code used for p2 and p3 in the time domain. All ports in a port group are mapped on a same time-frequency resource and are distinguished from each other according to different time domain codes or frequency domain codes.

Figure 3:
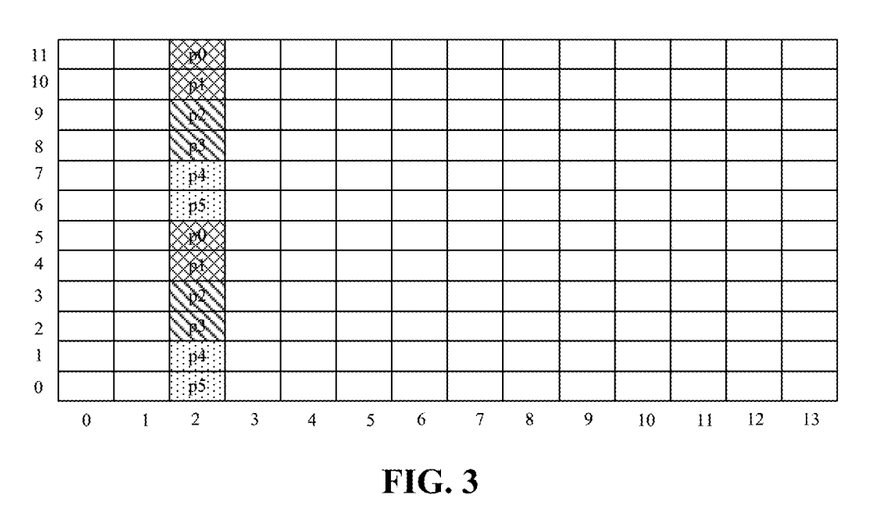
FIG. 3 is a schematic diagram of a correspondence of one DMRS time domain symbol in a demodulated reference signal type 2 according to an embodiment.

FIG. 3 is a schematic diagram of a correspondence of one DMRS time domain symbol in a demodulated reference signal type 2 according to an embodiment. As shown in FIG. 3, in a resource block (RB), the abscissa is the time domain and the ordinate is the frequency domain. 6 DMRS ports are divided into 3 CDM groups, and CDM group #0 includes ports p0 and p1. In CDM group #0, ports p0 and p1 are mapped to a same time-frequency resource by OCC codes. For example, the OCC code for port p0 is [1 1], and the OCC code for port p1 is [1 −1]. In one RB, the subcarriers mapped to ports p0 and p1 include subcarriers #4, #5 and #10, #11, respectively. Similarly, CDM group #1 includes ports p2 and p3. In CDM group #1, ports p2 and p3 are mapped to a same time-frequency resource by OCC codes. For example, the OCC code for port p2 is [1 1], and the OCC code for port p3 is [1 −1]. CDM group #2 includes ports p4 and p5. In the CDM group #2, ports p4 and p5 are mapped to a same time-frequency resource by OCC codes. For example, the OCC code for port p4 is [1 1], and the OCC code for port p5 is [1 −1]. These 6 DMRS ports may be assigned to one user, namely single-user multiple-input and multiple-output (SU-MIMO), and may also be assigned to multiple users, namely multi-user multiple-input and multiple-output (MU-MIMO). Although the pattern in FIG. 3 support a maximum of 6 DMRS ports, actually, a base station does not necessarily have to allocate 6 DMRS ports to a user when scheduling the user. For example, when few cell users exist and a total number of ports required by the user is small, the base station only needs to send one or two ports. The remaining DMRS port resources may be used for data transmission.

Figure 4:
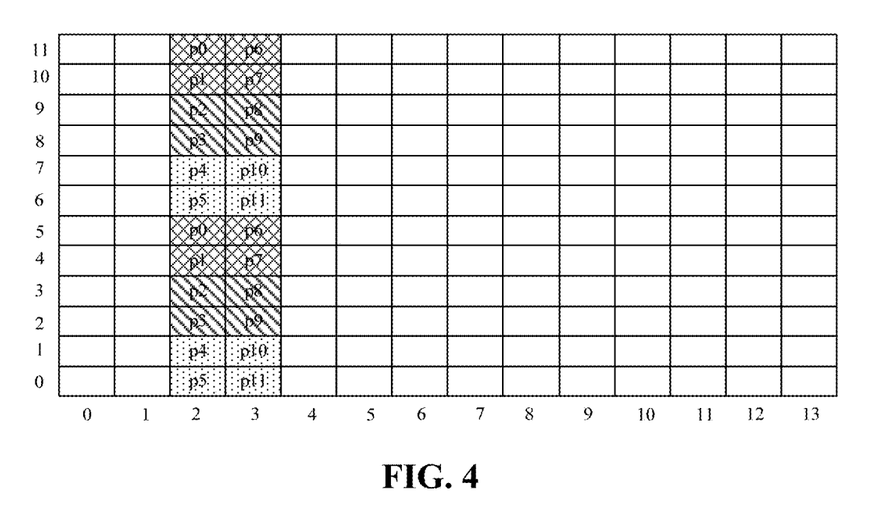
FIG. 4 is a schematic diagram of a correspondence of two DMRS time domain symbol in a demodulated reference signal type 2 according to an embodiment.

FIG. 4 is a schematic diagram of a correspondence of two DMRS time domain symbol in a demodulated reference signal type 2 according to an embodiment. As shown in FIG. 4, 12 DMRS ports are divided into 3 CDM groups. CDM group #0 includes ports p0, p1, p6 and p7; CDM group #1 includes ports p2, p3, p8 and p9; CDM group #2 includes ports p4, p5, p10 and p11. In CDM group #0, ports p0, p1, p6 and p7 occupy a same time-frequency resource, but only use different time domain or frequency domain OCC codes. For example, p0 and p1 are distinguished from each other according to the OCC code in the frequency domain, but use the same time domain OCC code. For example, the frequency domain OCC code used for p0 is [1 1], the frequency domain OCC code used for port p1 is [1 −1], and the time domain OCC code used for p0 and p1 is [1 1]; p6 and p7 are distinguished from each other according to the OCC code in the frequency domain, but use the same time domain OCC code. For example, the frequency domain OCC code for p6 is [1 1], the frequency domain OCC code for port p7 is [1 −1], and p6 and p7 both use the OCC code [1 −1] in the time domain. Similarly, the same applies to the 4 ports in other CDM groups. In CDM group #1, p2 and p3 use different frequency domain OCC codes, but use a same time domain OCC code, and p8 and p9 use different frequency domain OCC codes and use a same time domain OCC code, but the time domain OCC code used for p2 and p3 is different from the time domain OCC code used for p8 and p9. In CDM group #2, p4 and p5 use different frequency domain OCC codes, but use a same time domain OCC code, p10 and p11 use different frequency domain OCC codes, also use a same time domain OCC code, but the time domain OCC code used for p4 and p5 is different from the time domain OCC code used for p10 and p11.

In the present disclosure, based on the situation that transmission of DMRS port information requires a large amount of signaling overhead when only one codeword is activated, and requires a small amount of signaling overhead when only two codewords are activated in NR, and the situation that the DCI overhead increases due to the notification of DMRS port information, PTRS port information and SRI in NR, it is proposed to compress the information of these reference signals as much as possible, so as to reduce the overhead of DCI.

Figure 5:
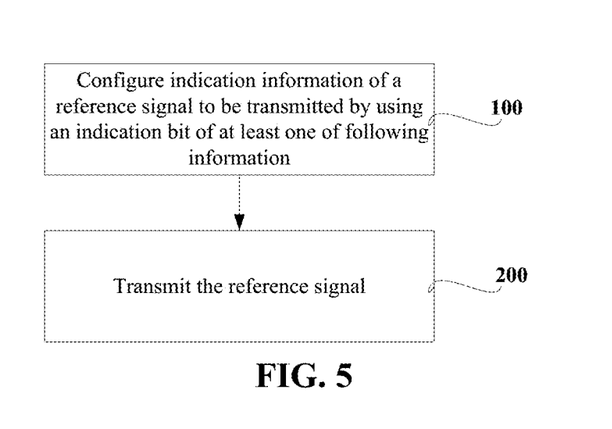
FIG. 5 is a schematic flowchart of a reference signal transmission method according to an embodiment.

FIG. 5 is a schematic flowchart of a reference signal transmission method according to an embodiment. As shown in FIG. 5, the method provided in the embodiment mainly includes the following steps.

In step 100, at least one of the following information indication bit is used to configure the indication information of the reference signal to be transmitted: port information of the demodulated reference signal, port correspondence information of the phase tracking reference signal, code block group related notification information, SRS resource indicator information, precoding matrix indicator information, or transmission layer number indicator information.

In step 200, the above reference signal is transmitted.

For example, part or all of the bits reserved for CBG related notification information may be used to configure at least one of the following information to be transmitted (that is, a reference signal to be transmitted): DMRS port information, PTRS port correspondence Information, SRI information, transmitted precoding matrix indicator (TPMI) information, or transfer rank indication (TRI) information.

In an embodiment, when two codewords are configured in the upper layer and only one of the two codewords is activated, part or all of the bits of the CBG related notification information reserved for the inactive codeword may be used to configure the port information of the DMRS to be transmitted.

The CBG related notification information involved in the disclosure includes code block group transmission information and/or code block group retransmission information. In an embodiment, according to the correspondence between the port correspondence information of the PTRS and at least one of the following information, the port corresponding information of the PTRS to be transmitted (that is, the reference signal to be transmitted) may be jointly indicated: SRI information, TPMI information, TRI information, or DMRS port information.

In an embodiment, when the port correspondence information of the PTRS to be transmitted is jointly indicate by using the TPMI information according to the correspondence between the port correspondence information of the PTRS and the TPMI information, the order of different transport layers in the TPMI information may be changed to indicate the port correspondence information of the PTRS.

In an embodiment, the correspondence between the SRI information and at least one of the following information may be used to configure indication information of the reference signal to be transmitted: port information of the DMRS, or port correspondence information of the PTRS.

In an embodiment, when the indication information of the reference signal to be transmitted is configured by using the correspondence between the SRI information and the port information of the DMRS, the number of DMRS ports may be notified by using the SRI information, and then high level signaling is used to configure the DMRS port information to be transmitted. In the present disclosure, when the number of configured DMRS ports belongs to a set A, the number of indexes in the configured port information of the demodulated reference signal to be transmitted is equal to or less than S, where S is a positive integer, and the set A is a subset of a set B of numbers of DMRS ports supported by a user.

In an embodiment, when the configured number of DMRS ports belongs to the set A, an indication table is selected from port information indication tables of all DMRS corresponding to the pre-configured set A through the high level signaling as the port information of the DMRS to be transmitted, where the number of indexes in each of the port information indication tables of all DMRS corresponding to the set A do not exceed S. Each element contained in the set A is smaller than each and every element contained in the set B but not in the set A.

In an embodiment, the SRI information and the configured correspondence between a SRS resource and DMRS port may be used to configure the port information of the DMRS to be transmitted.

In an embodiment, in a first configuration manner, in the correspondence between the configured SRS resource and the DMRS port, two DMRS ports in 2-layer data transmission correspond to SRS resources from a same SRS resource pair.

In a second configuration method, in the correspondence between the configured SRS resource and the DMRS port, a first DMRS port and a second DMRS port in 3-layer data transmission may also be configured to correspond to SRS resources from a same SRS resource pair, a third DMRS port corresponds to an SRS resource in a resource pair other than the resource pairs corresponding to the first reference signal port and the second DMRS port, and an SRS resource group corresponding to the third DMRS port is different from SRS resource groups occupied by the first and second DMRS ports.

In a third configuration method, in the correspondence between the configured SRS resource and the DMRS port, four DMRS ports of 4-layer data transmission may be configured to correspond to SRS resources from two different SRS resource pairs, and the two SRS resource pairs belong to different resource groups.

In an embodiment, the above three configuration methods may be respectively applied to different correspondences between the SRS resource and the DMRS port, or two or three of the three configuration methods may be applied to a same correspondence between the SRS resource and the DMRS port.

The embodiment further provides a reference signal transmission method, and the method includes following steps.

Port correspondence information of a PTRS is transmitted by using 1-bit DCI signaling, where the port correspondence information of PTRS includes the PTRS corresponds to one of first two ports in multiple DMRS ports, or the PTRS corresponds to one of first two data layers of multiple data layers in TPMI.

The embodiment further provides a device for implementing the above reference signal transmission method, where the device is a first communication node device or a second communication node device, such as a base station or user device.

The following describes the implementation with specific applications.

Embodiment 1

Each codeword (CW) in LTE has a corresponding indication field for a modulation and coding scheme (MCS), a redundancy version (RV), and a new data indication (NDI), and two codewords correspond to two transmission blocks (TB) to transmit data. LTE users support multi-layer transmission, and each data layer corresponds to a DMRS port. For initial transmission, when the number of data layers allocated for a user is greater than 1, 2 TBs are required for transmission. In NR, for initial transmission, when the number of data layers allocated for a user is more than 4, only 2 TBs are required for transmission. That is, in one CW, the number of data layers or DMRS ports allocated for a UE may be one of 1, 2, 3 or 4. At the same time, in order to support multiple-input multiple-output (MIMO), each DMRS port may have a different scrambling identification (ID), similar to $n_{SCID}$ in LTE. However, in MU-MIMO, a user often corresponds to a CW. In MU-MIMO, NR supports non-transparent transmission, that is, a base station needs to tell the user whether other users exist to do multi-user scheduling with the user. This results in a very large signaling overhead of port information for notifying the DMRS in case of one CW. The signaling overhead of port information for notifying the DMRS is very small in case of two CWs. That is to say, in NR, since one codeword is enough for the transmission of four or less layers, in the case of two codewords configured at the high layer, the transmission of DMRS port information when only one codeword is activated requires a large amount of signaling overhead, and a small amount of signaling overhead when two codewords are activated. Based on the situation, the embodiment provides a method for reducing DCI overhead.

Table 1 illustrates an example in which DMRS needs to be notified when DMRS type (type 2) and an OFDM symbol exist. At this time, 48 indexes are required for notification in case of 1 CW, that is, 6 bits of reserved DCI bits are required. For 2 codewords, only 4 indexes, i.e., 2 bits, are needed. However, since the scheduling of single and double codewords is dynamic, DCI must follow the maximum 6 bits overhead.

TABLE 1

DMRS port indication information in DMRS type 2, index correspondence table when one front loaded DMRS symbol exists

| Value | DMRS layers | DMRS port(s) | DMRS symbols | CDM group for data | Scrambling ID | # of CWs | layers | DMRS port(s) | DMRS symbols | CDM group for data | Scrambling ID | # of CWs |
|---|---|---|---|---|---|---|---|---|---|---|---|---|
| 0 | 1 | 0 | 1 | 1, 2 | 0 | 1 | 5 | 0-4 | 1 | | 0 | 2 |
| 1 | 1 | 0 | 1 | 2 | 0 | 1 | 6 | 0-5 | 1 | | 0 | 2 |
| 2 | 1 | 0 | 1 | | 0 | 1 | 5 | 0-4 | 1 | | 0 | 2 |
| 3 | 1 | 1 | 1 | 1, 2 | 0 | 1 | 6 | 0-5 | 1 | | 0 | 2 |
| 4 | 1 | 1 | 1 | 2 | 0 | 1 | | | | | | |
| 5 | 1 | 1 | 1 | | 0 | 1 | | | | | | |
| 6 | 1 | 2 | 1 | 2 | 0 | 1 | | | | | | |
| 7 | 1 | 2 | 1 | | 0 | 1 | | | | | | |
| 8 | 1 | 3 | 1 | 2 | 0 | 1 | | | | | | |
| 9 | 1 | 3 | 1 | | 0 | 1 | | | | | | |
| 10 | 1 | 4 | 1 | | 0 | 1 | | | | | | |
| 11 | 1 | 5 | 1 | | 0 | 1 | | | | | | |
| 12 | 2 | 0, 1 | 1 | 1, 2 | 0 | 1 | | | | | | |
| 13 | 2 | 0, 1 | 1 | 2 | 0 | 1 | | | | | | |
| 14 | 2 | 0, 1 | 1 | | 0 | 1 | | | | | | |
| 15 | 2 | 2, 3 | 1 | 2 | 0 | 1 | | | | | | |
| 16 | 2 | 2, 3 | 1 | | 0 | 1 | | | | | | |
| 17 | 2 | 4, 5 | 1 | | 0 | 1 | | | | | | |
| 18 | 2 | 0, 2 | 1 | 2 | 0 | 1 | | | | | | |
| 19 | 3 | 0, 1, 2 | 1 | 2 | 0 | 1 | | | | | | |
| 20 | 3 | 0, 1, 2 | 1 | | 0 | 1 | | | | | | |
| 21 | 3 | 3, 4, 5 | 1 | | 0 | 1 | | | | | | |
| 22 | 4 | 0-3 | 1 | 2 | 0 | 1 | | | | | | |
| 23 | 4 | 0-3 | 1 | | 0 | 1 | | | | | | |
| 24 | 1 | 0 | 1 | 1, 2 | 1 | 1 | | | | | | |
| 25 | 1 | 0 | 1 | 2 | 1 | 1 | | | | | | |
| 26 | 1 | 0 | 1 | | 1 | 1 | | | | | | |
| 27 | 1 | 1 | 1 | 1, 2 | 1 | 1 | | | | | | |
| 28 | 1 | 1 | 1 | 2 | 1 | 1 | | | | | | |
| 29 | 1 | 1 | 1 | | 1 | 1 | | | | | | |
| 30 | 1 | 2 | 1 | 2 | 1 | 1 | | | | | | |
| 31 | 1 | 2 | 1 | | 1 | 1 | | | | | | |
| 32 | 1 | 3 | 1 | 2 | 1 | 1 | | | | | | |
| 33 | 1 | 3 | 1 | | 1 | 1 | | | | | | |
| 34 | 1 | 4 | 1 | | 1 | 1 | | | | | | |
| 35 | 1 | 5 | 1 | | 1 | 1 | | | | | | |
| 36 | 2 | 0, 1 | 1 | 1, 2 | 1 | 1 | | | | | | |
| 37 | 2 | 0, 1 | 1 | 2 | 1 | 1 | | | | | | |
| 38 | 2 | 0, 1 | 1 | | 1 | 1 | | | | | | |
| 39 | 2 | 2, 3 | 1 | 2 | 1 | 1 | | | | | | |
| 40 | 2 | 2, 3 | 1 | | 1 | 1 | | | | | | |
| 41 | 2 | 4, 5 | 1 | | 1 | 1 | | | | | | |
| 42 | 2 | 0, 2 | 1 | 2 | 1 | 1 | | | | | | |
| 43 | 3 | 0, 1, 2 | 1 | 2 | 1 | 1 | | | | | | |
| 44 | 3 | 0, 1, 2 | 1 | | 1 | 1 | | | | | | |
| 45 | 3 | 3, 4, 5 | 1 | | 1 | 1 | | | | | | |
| 46 | 4 | 0-3 | 1 | 2 | 1 | 1 | | | | | | |
| 47 | 4 | 0-3 | 1 | | 1 | 1 | | | | | | |

For each transmission block in LTE, the base station configures one modulation coding mode/redundant version/new data indicator (MCS/RV/NDI) indication field (5+1+2=8 bits) in DCI for each CW. where the MCS requires 5 bits, the NDI requires 1 bit, and the RV requires 2 bits. Although the MCS/RV/NDI indication fields corresponding to the two CWs always exist, the base station may schedule only one CW at some moments and deactivate the other CW. After receiving one or two TBs from the base station, the user performs data demodulation, and then feeds back an acknowledgement/negative acknowledgement (ACK/NACK, A/N) for each TB block, indicating whether the corresponding TB demodulation is correct. If the demodulation is correct, the user feeds back A, and if the demodulation is not correct, the user feeds back N. When only 1 TB is transmitted, only 1 bit needs to be fed back. For example, 0 indicates incorrect demodulation, and 1 indicates correct demodulation. When the base station sends 2 TBs to the user, the user needs to feedback 2 bits A/N.

When the number of DMRS ports sent by the base station to the user is large, that is, when the number of data layers to be sent is large or the number of resources allocated to the user is large, since only 2 TBs exist, each TB contains a large amount of data transmission. At this time, just like LTE, when channel coding is performed, since a TB is too large, the TB is divided into multiple code blocks (CBs). If one A/N is fed back for each TB as in LTE, as long as one CB in the TB is transmitted incorrectly, the entire TB needs to be retransmitted even if the other CBs are transmitted correctly. This is not conducive to the improvement of transmission efficiency. If a TB is divided into many CBs, and an A/N is fed back for each CB, then the feedback overhead is too much. In order to compromise the feedback overhead and transmission efficiency, at least one CB may be grouped into a CB group, that is, a CBG, and an A/N is fed back for each CBG. When scheduling, the base station configures in the DCI code block group transmitted information (CBGTI) or code block group flushing out information (CBGFI) for each CBG to indicate whether the previous CBG transmission is correct or not, or which CBG of the current transmission is retransmission with respect to last transmission. In an embodiment, GBGTI is an indication signaling for indicating CBG transmission or retransmission, and CBGFI is an indication for different soft combination information during CBG retransmission. GBGTI and GBGFI are defined as follows: CBG transmission information (CBGTI) means information on which CBG (s) is/are (re)transmitted and, CBG flushing out information (CBGFI) means information on which CBG(s) is/are handled differently for soft-buffer/hybrid automatic repeat request (HARQ) combining. CBG transmission information (CBGTI) means information of which CBG (S) is transmitted or retransmitted, and CBG retransmission information (CBGFI) means which CBG(s) due to soft buffering/hybrid automatic repeat request merging is handled differently.

In an embodiment, the CBGFI may also be configured for each CW.

Generally, a base station may configure the number of CWs through high layer signaling, such as one or two. If the upper layer configures 2 CWs for a user, the actual transmission may be dynamically switched between 1 CW and 2 CWs. At this time, if the total number of code block groups configured by the base station through high layer signaling is X, then the number of CBGs of each CW is X/2. The base station usually informs the CBGTI with X bits. The CBGTI indication overhead of each CW is X/2 bits. In a certain time slot, if only one CW is activated, then the other CW is not activated, and the CBGTI and/or CBGFI bits of the inactive CW are not applied at this time.

Therefore, in the embodiment, these unused bits are used for the DMRS port information indication (that is, all or part of the bits of the CBG related notification information reserved for the inactive codeword is used to transmit the DMRS port information). That is, indication bits of port information of the CBGTI and/or CBGFI and DMRS are transmitted in the DCI.

Generally, X bits are reserved in DCI for CBGTI and/or CBGFI, and then Y bits are reserved for port information indication of the DMRS. In the embodiment, when two CWs are configured by the upper layer, if only one CW is activated, then Z=floor(X/2) bits or Z=ceil(X/2) bits in the reserved X bits are used for indication of CBGTI and/or CBGFI of the activated CW, and all or part of the remaining (X-Z) bits may be used for indication of DMRS port information. If both CWs are activated, that is, both CWs have data transmission, then X bits are used for CBGTI and/or CBGFI indication.

Since the overhead requirements for the indication of the DMRS port information in one CW and two CWs in the NR are very different, the method in the embodiment greatly reduces the overhead of the DCI. For example, 8 bits are reserved in DCI for CBGTI, if two CWs are configured by the upper layer and only one CW has data transmission, then only 4 bits are used for the CBGTI indication of the activated codeword, and the remaining 4 bits may be used for indication of DMRS port information of one CW (in other embodiments of the present disclosure, part of the remaining 4 bits may also be used for indication of DMRS port information). Based on the example of table 1, the DMRS port information indicator bit originally needs 6 bits, combined with the reserved 4 bits CBGTI indicator, and additional 2 bits are enough. Therefore, in general, it is sufficient to reserve indicate (8+2)=10 bits for the CBGTI and DMRS port information. If the CBGTI and DMRS port information are independently indicated, then (8+6)=14 bits are required.

The above is only an example. In addition to CBGTI and CBGFI of the CBG related notification information, the NDI indication may also be used to transmit the DMRS port information indication. The scheme is similar to the above described scheme. That is, if two CWs configured by the high layer or predefined exist, when only one CW is activated, the DMRS indication may be transmitted in any of the following ways.

1. All or part of indication bits reserved for CBGTI, CBGFI, and NDI of the inactive CW are used to transmit the DMRS port information.

2. All or part of indication bits reserved for CBGTI and CBGFI of the inactive CW are used to transmit the DMRS port information.

3. All or part of indication bits reserved for CBGTI and NDI of the inactive CW are used to transmit the DMRS port information.

4. All or part of indication bits reserved for CBGFI and NDI of the inactive CW are used to transmit the DMRS port information.

5. All or part of indication bits reserved for CBGTI of the inactive CW are used to transmit the DMRS port information.

6. All or part of indication bits reserved for CBGFI of the inactive CW are used to transmit the DMRS port information.

When the above scheme is adopted and the port information of the DMRS is transmitted by using part or all of bits reserved for an inactive codeword in the CBG related notification information, if the number n of bits used is less than the number N of bits required for the port information of the DMRS transmitted, and (N-n) additional bits are allocated for transmitting the port information of the DMRS. That is, N bits are complemented to indicate DMRS port information.

In an embodiment, since the CBG related information indicator is generally useless when the user first transmits/receives data, that is, CBGTI or CBGFI will only be applied when retransmitting. Therefore, all or part of the CBG related information indicator bits may have other use. For example, all or part of the CBG related information indicator bits may be used for transmitting DMRS port information, SRI, PMI and channel state information reference signal resource indicator (CRI).

The DMRS port information described in the present disclosure refers to at least one of the number of DMRS ports, a serial number, a scrambling ID, or whether the DMRS port is used for data transmission.

Embodiment 2

In NR, uplink transmission is different from downlink transmission since the uplink is divided into a case with channel reciprocity and a case without channel reciprocity. Without channel reciprocity, a UE has no way to obtain an uplink precoding matrix and the number of transmission layers by estimating the downlink channel state information reference signal (CSI-RS). At this time, a base station needs to notify the user of a TPMI when scheduling data. The scheduling method is called a codebook-based transmission method since the TPMI is an index in an uplink codebook. Of course, like the downlink, the base station also needs to notify the user of the DMRS port information.

For reference signals, an important point in NR different from LTE is that PTRS is introduced in NR. The main purpose is to estimate a phase deviation due to phase noise between different OFDM symbols, and then compensate when demodulating data. Since the effect of the phase noise is often the same for an antenna panel, a base station, a UE, and a crystal oscillator, ports of multiple demodulated reference signals may often share a PTRS port. That is, for multiple DMRS ports, it is sufficient that the base station configures a PTRS for the user. The phase deviation estimated by the PTRS may be applied to multiple DMRS ports. For uplink transmission, since a UE is relatively small, a crystal oscillator is usually sufficient. At this point, it is sufficient for one user to configure one PTRS port. In order to facilitate a design, the precoder of the configured PTRS may be the same as a DMRS port. However, which one of multiple DMRS ports corresponds to the PTRS port needs to be notified by the base station. Generally, the base station chooses the best channel condition in the DMRS ports.

Figure 6A:
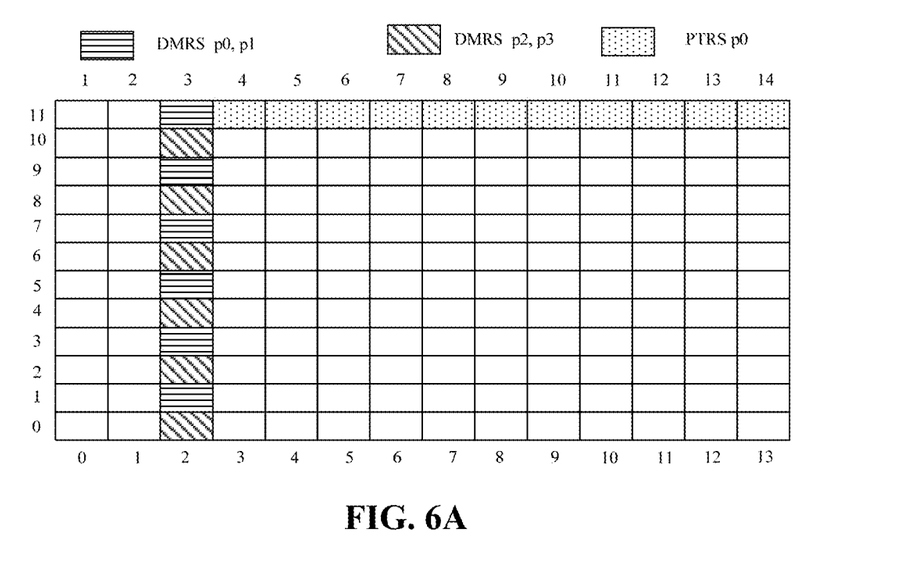
FIG. 6A is a schematic diagram of PTRS port mapping according to an embodiment.
Figure 6B:
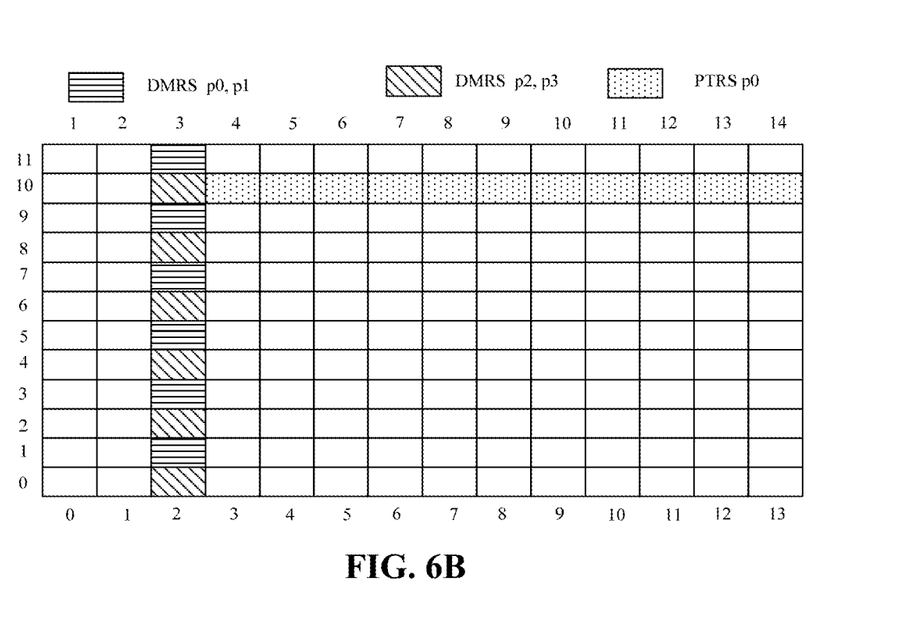
FIG. 6B is a schematic diagram of PTRS port mapping according to another embodiment.

As shown in FIG. 6, it is assumed that four DMRS ports are scheduled by the base station to UE0, and the base station may indicate that the DMRS port corresponding to the PTRS port is one of DMRS p0 or p1, as shown in FIG. 6A. Or the DMRS port corresponding to the PTRS port is one of p2 or p3, as shown in FIG. 6B. If the PTRS port corresponds to the DMRS port pi, then the PTRS port p0 and the DMRS port pi use a same precoder. And generally PTRS is mapped on a certain subcarrier of the corresponding DMRS port.

Intuitively, the base station needs to reserve Q bits to indicate which one of the scheduled DMRS ports corresponds to the PTRS port. If the number of DMRS ports is N=1, no indication is required; if N=2, 1 bit is required to indicate which one of the 2 DMRS ports corresponds to the PTRS port; and if N=3, 2 bits are required to indicate which one of the 3 DMRS ports corresponds to the PTRS port; and if N=4, 2 bits are also required to indicate which one of the 4 DMRS ports corresponds to the PTRS port. Since the size of the DCI cannot be dynamically changed, it must be reserved according to the maximum overhead, that is, 2 bits are reserved in DCI to indicate which DMRS port corresponds to the PTRS port.

In the embodiment, based on the situation that the DCI overhead increases due to the port correspondence information of the PTRS in the NR, following methods are proposed.

A first method to save DCI overhead is to use only 1 bit to notify a correspondence between PTRS and DMRS. The 1 bit always indicates PTRS corresponds to DMRS port 0 or port 1. That is, even if the UE is allocated more than 2 DMRS ports, the 1 bit indicates that the PTRS corresponds to one of the first two ports in the DMRS allocated to the UE. For example, DMRS ports allocated by UE0 is DMRS port 1, 2 and 3, then 1 bit is used to indicate whether the PTRS port corresponds to DMRS port p1 or p2. The method is a compromise between DCI overhead and PTRS performance. Although when the DMRS port is one, this 1 bit is wasted, and when the DMRS port is two, the overhead is greatly saved.

The second method to save DCI overhead is to jointly encode port correspondence information of TPMI and PTRS. This is because the size of the PTRS port information indicated by different TRIs, that is, different numbers of transport layers is different. Take a 2-antenna codebook as an example, as shown in Table 2. When the base station schedules, the TPMI indicated in the DCI is an index in Table 2. PTRS port correspondence (also called PTRS port correspondence information) refers to the correspondence between PTRS and DMRS ports, or the correspondence between PTRS and one of the transport layers, such as which column in the TPMI corresponds. In an embodiment, during multi-SRI transmission, the PTRS port correspondence may also refer to a correspondence between PTRS and an SRS resource in an SRI indication.

TABLE 2

TPMI indication table in an uplink 2 antenna codebook

| Codebook index | Number of layers | |
|---|---|---|
| | 1 | 2 |
| 0 | $\frac{1}{\sqrt{2}}\begin{bmatrix}1\\1\end{bmatrix}$ | $\frac{1}{2}\begin{bmatrix}1 & 1\\1 & -1\end{bmatrix}$ |
| 1 | $\frac{1}{\sqrt{2}}\begin{bmatrix}1\\-1\end{bmatrix}$ | $\frac{1}{2}\begin{bmatrix}1 & 1\\j & -j\end{bmatrix}$ |
| 2 | $\frac{1}{\sqrt{2}}\begin{bmatrix}1\\j\end{bmatrix}$ | $\frac{1}{\sqrt{2}}\begin{bmatrix}1 & 0\\0 & 1\end{bmatrix}$ |
| 3 | $\frac{1}{\sqrt{2}}\begin{bmatrix}1\\-j\end{bmatrix}$ | |
| 4 | $\frac{1}{\sqrt{2}}\begin{bmatrix}1\\0\end{bmatrix}$ | |
| 5 | $\frac{1}{\sqrt{2}}\begin{bmatrix}0\\1\end{bmatrix}$ | |

In the embodiment, it is proposed that port correspondence information of TPMI and PTRS may be coded jointly. At this time, the uplink codebook index becomes as shown in Table 3. In this way, a joint indicator bit is used to represent the port correspondence information of TPMI and PTRS, which can effectively save DCI overhead. It can be seen that for the example in Table 3, there is no increase in DCI overhead, since the PTRS port indication is not required when TRI=1. In other words, when scheduling, the base station uses the TPMI indicated in the DCI, which is an index in Table 3. This index bit indicates both the TPMI and PTRS port correspondence information, that is, the order of the different transport layers in the TPMI information may indicate the port correspondence information of different PTRS (that is, the correspondence between PTRS and a certain transport layer in the number of transport layers). 1st indicates that the PTRS port corresponds to a first layer in 2-layer transmission, and 2nd indicates that the PTRS port corresponds to a second layer in 2-layer transmission. Generally, the number of DMRS ports is equal to the number of layers indicated by TPMI, and the number of TPMI layers corresponds to the number of precoded columns indicated by TPMI. One layer corresponds to one column in a precoding matrix. This method of jointly encoding TPMI and PTRS is very effective in the subband TPMI indication, since the TPMI is different, the resulting channel condition is different. Therefore, after joint coding, even on subbands, port correspondence information for different PTRS may be choosed, that is, PTRS is always kept corresponding to the best layer, and different layers correspond to columns in different precoding matrices.

TABLE 3

Correspondence table of port correspondence information when uplink 2 antenna codebook jointly indicates PTRS

| Codebook index | Number of layers 1 | Number of layers 2 | Which layer is associated with PTRS |
|---|---|---|---|
| 0 | $\frac{1}{\sqrt{2}}\begin{bmatrix}1\\1\end{bmatrix}$ | $\frac{1}{2}\begin{bmatrix}1 & 1\\1 & -1\end{bmatrix}$ | $1^{st}$ |
| 1 | $\frac{1}{\sqrt{2}}\begin{bmatrix}1\\-1\end{bmatrix}$ | $\frac{1}{2}\begin{bmatrix}1 & 1\\j & -j\end{bmatrix}$ | |
| 2 | $\frac{1}{\sqrt{2}}\begin{bmatrix}1\\j\end{bmatrix}$ | $\frac{1}{\sqrt{2}}\begin{bmatrix}1 & 0\\0 & 1\end{bmatrix}$ | |
| 3 | $\frac{1}{\sqrt{2}}\begin{bmatrix}1\\-j\end{bmatrix}$ | $\frac{1}{2}\begin{bmatrix}1 & 1\\1 & -1\end{bmatrix}$ | $2^{nd}$ |
| 4 | $\frac{1}{\sqrt{2}}\begin{bmatrix}1\\0\end{bmatrix}$ | $\frac{1}{2}\begin{bmatrix}1 & 1\\j & -j\end{bmatrix}$ | |
| 5 | $\frac{1}{\sqrt{2}}\begin{bmatrix}0\\1\end{bmatrix}$ | $\frac{1}{\sqrt{2}}\begin{bmatrix}1 & 0\\0 & 1\end{bmatrix}$ | |

The third method to save DCI overhead is to jointly encode port correspondence information of DMRS and PTRS. Take DMRS type 1 as an example. Assume one front loaded DMRS, as shown in Table 4. When the base station schedules users, the base station notifies an index indicating the port information of the DMRS in the DCI.

TABLE 4

Schematic table of 1 front loaded DMRS in DMRS type 1 used for DMRS port indication information

| Value | layers | DMRS port(s) | DMRS symbols | CDM group for data | Scrambling ID | # of CWs |
|---|---|---|---|---|---|---|
| 0 | 1 | 0 | 1 | 1 | 0 | 1 |
| 1 | 1 | 0 | 1 | | 0 | 1 |
| 2 | 1 | 1 | 1 | 1 | 0 | 1 |
| 3 | 1 | 1 | 1 | | 0 | 1 |
| 4 | 1 | 2 | 1 | | 0 | 1 |
| 5 | 1 | 3 | 1 | | 0 | 1 |
| 6 | 1 | 0 | 1 | 1 | 1 | 1 |
| 7 | 1 | 0 | 1 | | 1 | 1 |
| 8 | 1 | 1 | 1 | 1 | 1 | 1 |
| 9 | 1 | 1 | 1 | | 1 | 1 |
| 10 | 1 | 2 | 1 | | 1 | 1 |
| 11 | 1 | 3 | 1 | | 1 | 1 |
| 12 | 2 | 0, 1 | 1 | 1 | 0 | 1 |
| 13 | 2 | 0, 1 | 1 | | 0 | 1 |
| 14 | 2 | 2, 3 | 1 | | 0 | 1 |
| 15 | 2 | 0, 2 | 1 | | 0 | 1 |
| 16 | 2 | 0, 1 | 1 | 1 | 1 | 1 |
| 17 | 2 | 0, 1 | 1 | | 1 | 1 |
| 18 | 2 | 2, 3 | 1 | | 1 | 1 |
| 19 | 2 | 0, 2 | 1 | | 1 | 1 |
| 20 | 3 | 0-2 | 1 | | 0 | 1 |
| 21 | 4 | 0-3 | 1 | | 0 | 1 |

The port indication information of DMRS and PTRS is jointly coded, as shown in Table 5. Compared with Table 4, just adding 1 bit may fully represent the port correspondence between PTRS and DMRS port information. That is, when the base station schedules a user, notifying an index in the DCI jointly indicates the port information of the DMRS and the port corresponding information of the PTRS. In an embodiment, since the TRI has notified the number of DMRS ports, Table 5 may be split into multiple tables. For example, Table 5-1 contains DMRS port information with a DMRS port number of 1, and Table 5-2 contains the joint port information of DMRS and PTRS with the DMRS port number of 2, Table 5-3 contains the joint port information of DMRS and PTRS with the DMRS port number of 3, and Table 5-4 contains the joint port information of DMRS and PTRS with the DMRS port number of 4.

TABLE 5-1

Index comparison table of one front loaded DMRS used for DMRS and PTRS combined port indication information in DMRS type 1

| Value | layers | DMRS port(s) | DMRS (symbols) | CDM group for data | Scrambling ID | # of CWs | PTRS port |
|---|---|---|---|---|---|---|---|
| 0 | 1 | 0 | 1 | 1 | 0 | 1 | |
| 1 | 1 | 0 | 1 | | 0 | 1 | |
| 2 | 1 | 1 | 1 | 1 | 0 | 1 | |
| 3 | 1 | 1 | 1 | | 0 | 1 | |
| 4 | 1 | 2 | 1 | | 0 | 1 | |
| 5 | 1 | 3 | 1 | | 0 | 1 | |
| 6 | 1 | 0 | 1 | 1 | 1 | 1 | |
| 7 | 1 | 0 | 1 | | 1 | 1 | |
| 8 | 1 | 1 | 1 | 1 | 1 | 1 | |
| 9 | 1 | 1 | 1 | | 1 | 1 | |
| 10 | 1 | 2 | 1 | | 1 | 1 | |
| 11 | 1 | 3 | 1 | | 1 | 1 | |

TABLE 5-2

Index comparison table of two front loaded DMRSs used for DMRS and PTRS combined port indication information in DMRS type 1

| Value | layers | DMRS port(s) | DMRS symbol | CDM group for data | Scrambling ID | # of CWs | PTRS port |
|---|---|---|---|---|---|---|---|
| 12 | 2 | 0, 1 | 1 | 1 | 0 | 1 | 1st |
| 13 | 2 | 0, 1 | 1 | | 0 | 1 | 1st |
| 14 | 2 | 2, 3 | 1 | | 0 | 1 | 1st |
| 15 | 2 | 0, 2 | 1 | | 0 | 1 | 1st |
| 16 | 2 | 0, 1 | 1 | 1 | 1 | 1 | 1st |
| 17 | 2 | 0, 1 | 1 | | 1 | 1 | 1st |
| 18 | 2 | 2, 3 | 1 | | 1 | 1 | 1st |
| 19 | 2 | 0, 2 | 1 | | 1 | 1 | 1st |
| 20 | 2 | 0, 1 | 1 | 1 | 0 | 1 | 2nd |
| 21 | 2 | 0, 1 | 1 | | 0 | 1 | 2nd |
| 22 | 2 | 2, 3 | 1 | | 0 | 1 | 2nd |
| 23 | 2 | 0, 2 | 1 | | 0 | 1 | 2nd |
| 24 | 2 | 0, 1 | 1 | 1 | 1 | 1 | 2nd |
| 25 | 2 | 0, 1 | 1 | | 1 | 1 | 2nd |
| 26 | 2 | 2, 3 | 1 | | 1 | 1 | 2nd |
| 27 | 2 | 0, 2 | 1 | | 1 | 1 | 2nd |

TABLE 5-3

Index comparison table of three front loaded DMRSs used for DMRS and PTRS combined port indication information in DMRS type 1

| Value | layers | DMRS port(s) | DMRS symbol | CDM group for data | Scrambling ID | # of CWs | PTRS port |
|---|---|---|---|---|---|---|---|
| 28 | 3 | 0-2 | 1 | | 0 | 1 | 1st |
| 29 | 3 | 0-2 | 1 | | 0 | 1 | 2nd |
| 30 | 3 | 0-2 | 1 | | 0 | 1 | 3rd |

TABLE 5-4

Index comparison table of four front loaded DMRSs used for DMRS
and PTRS combined port indication information in DMRS type 1

| Value | layers | DMRS port(s) | DMRS symbol | CDM group for data | Scrambling ID | # of CWs | PTRS port |
|---|---|---|---|---|---|---|---|
| 31 | 4 | 0-3 | 1 | | 0 | 1 | 1st |
| 32 | 4 | 0-3 | 1 | | 0 | 1 | 2nd |
| 33 | 4 | 0-3 | 1 | | 0 | 1 | 3rd |
| 34 | 4 | 0-3 | 1 | | 0 | 1 | 4th |

In LTE, when 4 antennas exist, the base station may jointly notify TPMI and TRI in DCI. However, in the DMRS notification, as shown in Table 4, the number indication of DMRS ports is equivalent to TRI. Such repeated notifications cause an increase in DCI overhead.

Therefore, the fourth method to reduce the DCI overhead is to jointly notify the port information of the TRI, TPMI, DMRS, and PTRS. That is, the port information of the TRI, TPMI, DMRS, and PTRS is written into a table. When the base station uses the DCI notification, an index represents the joint indication information.

In the above method, the default is that the columns in TPMI and DMRS ports correspond identically. For example, the DMRS port notified to the user is DMRS p2 and p3, and the precoding corresponding to TPMI is $$\frac{1}{2}\begin{bmatrix} 1 & 1 \\ j & -j \end{bmatrix},$$

then the default precoding for DMRS p2 is $$\frac{1}{2}\begin{bmatrix} 1 \\ j \end{bmatrix},$$

and the precoding for p3 is $$\frac{1}{2}\begin{bmatrix} 1 \\ -j \end{bmatrix}.$$

If the PTRS port information is first, the PTRS port corresponds to the first port, i.e., p2, of the DMRS port; if the PTRS port information is second, the PTRS port corresponds to the second port, i.e., p3, of the DMRS port. In this case, the DMRS port corresponding to the PTRS is not fixed, that is, the frequency domain position of the PTRS is different due to different corresponding DMRS ports. As shown in FIG. 6A and FIG. 6B in FIG. 6, the subcarrier positions of the PTRS are different due to different DMRS ports corresponding to the PTRS. In order to relatively fix the frequency domain position of the PTRS, the above PTRS port indication information may be understood as whether the precoding sequence is swapped or not. In other words, the correspondence between the precoding indicated by the TPMI and the DMRS port is changed by using the indication information of the PTRS port. At this time, the PTRS port may be pre-configured to correspond to the designated layer (that is, the order of different transport layers in the TPMI information is changed to indicate the PTRS port correspondence information). For example, the default is to correspond PTRS with a first DMRS port allocated by scheduling. As shown in Table 6, in the precoding corresponding to index 0 and index 3, PTRS is the first column corresponding to the precoding, and the first column corresponds to the first one of the allocated DMRS ports, but actually the vectors in the first column of index 0 and index 3 are different.

TABLE 6

Correspondence table between TPMI column after uplink 2
antenna codebook conversion and PTRS port information

| Codebook index | Number of layers | | Which layer is associated with PTRS |
|---|---|---|---|
| | 1 | 2 | |
| 0 | $\frac{1}{\sqrt{2}}\begin{bmatrix} 1 \\ 1 \end{bmatrix}$ | $\frac{1}{2}\begin{bmatrix} 1 & 1 \\ 1 & -1 \end{bmatrix}$ | first column |
| 1 | $\frac{1}{\sqrt{2}}\begin{bmatrix} 1 \\ -1 \end{bmatrix}$ | $\frac{1}{2}\begin{bmatrix} 1 & 1 \\ j & -j \end{bmatrix}$ | |
| 2 | $\frac{1}{\sqrt{2}}\begin{bmatrix} 1 \\ j \end{bmatrix}$ | $\frac{1}{\sqrt{2}}\begin{bmatrix} 1 & 0 \\ 0 & 1 \end{bmatrix}$ | |
| 3 | $\frac{1}{\sqrt{2}}\begin{bmatrix} 1 \\ -j \end{bmatrix}$ | $\frac{1}{2}\begin{bmatrix} 1 & 1 \\ -1 & 1 \end{bmatrix}$ | first column |
| 4 | $\frac{1}{\sqrt{2}}\begin{bmatrix} 1 \\ 0 \end{bmatrix}$ | $\frac{1}{2}\begin{bmatrix} 1 & 1 \\ -j & j \end{bmatrix}$ | |
| 5 | $\frac{1}{\sqrt{2}}\begin{bmatrix} 0 \\ 1 \end{bmatrix}$ | $\frac{1}{\sqrt{2}}\begin{bmatrix} 0 & 1 \\ 1 & 0 \end{bmatrix}$ | |

It can be seen from Table 6 that the codebook of the second transport layer of index 3 is swapped with the codebook TPMI column of the second transport layer of index 0, the codebook of the second transport layer of index 4 is swapped with the codebook TPMI column of the second transport layer of index 1, and the codebook of the second transport layer of index 5 is swapped with the codebook TPMI column of the second transport layer of index 2. That is, the order of different transport layers in the TPMI information indicates the port correspondence information of different PTRS. At this time, by default, the port of PTRS corresponds to the first column of the precoding matrix indicated by TPMI, and the column of the precoding matrix indicated by TPMI and the DMRS port index are also predefined, that is, one-to-one correspondence, and no signaling notice is required.

A similar method may keep the precoding in the codebook unchanged, but change the information order of the DMRS port. Take indexes 12 and 20 in Table 5-2 as an example, after transforming the DMRS port information, as shown in Table 7, index 12 is unchanged, and the order of allocated DMRS ports is converted in index 20. At this time, the PTRS port may always correspond to the first of the assigned DMRS ports. In index 12, PTRS corresponds to DMRS port 0; in index 20, PTRS corresponds to DMRS port 1. In the method, for a DMRS port set, the predefined port information indications of multiple DMRSs exist, orders of DMRS port information corresponding to different indication bits are different, but the DMRS ports included are the same. At this time, the PTRS always corresponds to the first DMRS port in the port information of the DMRS indicated by the indicator bit.

TABLE 7

Correspondence table of one front loaded DMRS used for DMRS
and PTRS joint indication port information in DMRS type 1

| Value | layers | DMRS port(s) | DMRS symbols | CDM group for data | Scrambling ID | # of CWs | PTRS port |
|---|---|---|---|---|---|---|---|
| 12 | 2 | 0, 1 | 1 | 1 | 0 | 1 | 1st |
| 20 | 2 | 1, 0 | 1 | 1 | 0 | 1 | 1st |

In order to ensure that the frequency domain position of PTRS remains unchanged, DMRS port 1 in index 20 should be mapped to a position of the original DMRS port 0, and DMRS port 0 should be mapped to a position of the original DMRS port 1.

In an embodiment, the method of the present disclosure may also be applied to the case of multiple PTRS ports.

Embodiment 3

For uplink, when channel reciprocity exists, a base station may calculate a precoding matrix for uplink transmission based on an SRS sent by a user, and the user may also calculate an equivalent uplink precoding through a downlink CSI-RS, so when scheduling data, it is not necessary to inform the user of an index, i.e., TPMI, of the precoding matrix used in the scheduling. At this time, the base station may configure multiple SRIs for the user, and the precoding used by the user when sending uplink data is the precoding of the SRS corresponding to the SRI, and the SRS resource indicated by the SRI has been previously sent by the UE. For convenience, an SRS resource indicated by an SRI is a single port SRS, and an SRS resource may correspond to a DMRS port. If the base station indicates to the user 2 SRIs in the DCI, then the 2 SRIs correspond to 2 DMRS ports, that is, 2 data layers. When the UE sends these two layers of data or two DMRS ports, the precoding used separately corresponds to the precoding of the SRS indicated by the two SRIs. So the process is that the base station first configures the UE with at least one SRS, and then the UE sends these SRS with different precoding, and the base station triggers data after receiving these SRS resources. Since the base station has received these SRS resources before, the base station knows which SRS channel has better conditions. When the data is triggered, the base station uses the SRI to indicate the precoding of the transmitted data.

For example, 4 bits are reserved in DCI for SRI indication field, and each bit represents an SRI. An upper layer of the base station configures four SRS resources {SRS resource 0, SRS resource 1, SRS resource 2, and SRS resource 3}, each SRS resource corresponds to a DMRS port, and then the 4 bits SRI indication field separately indicates whether the DMRS ports corresponding to the 4 SRSs are scheduled. For example, an indication field of the SRI domain is {1 1 0 0}, which means that 2 DMRS ports are scheduled, and the precoding used by the 2 DMRS ports is the same as the precoding of SRS resource 0 and 1, respectively. For another example, an indication field of the SRI domain is {1 1 0 1}, which means that 3 DMRS ports are scheduled, and the precoding used by the 3 DMRS ports is the same as the precoding of SRS resource 0, 10 and 3, respectively.

In order to notify the DMRS port indication information, M bits must be reserved in the DCI, as shown in Table 4. However, Table 4 also contains information of the total number of DMRS ports. Such repeated configuration results in wasted resources. Since the SRI indication field requires 4 bits, and the DMRS port indication requires 5 bits, for a total of 9 bits.

Therefore, the embodiment provides a method for reducing DCI overhead by jointly encoding DMRS port information and an indication of SRI. After the combination, as shown in Table 8, for a total of 101 indexes, a total of 7 bits are sufficient. Each index represents the joint information of the DMRS port information and SRI. The SRS resources indicated by the SRI correspond to the assigned DMRS ports one by one. For example, in index 67, the allocation of DMRS ports 0 and 2 corresponds to SRS resources 0 and 3.

TABLE 8

Index comparison table for joint notification
of DMRS port information and SRI indication

| Value | layers | DMRS port(s) | DMRS symbols | CDM group for data | Scrambling ID | SRI |
|---|---|---|---|---|---|---|
| 0 | 1 | 0 | 1 | 1 | 0 | |
| 1 | 1 | 0 | 1 | | 0 | |
| 2 | 1 | 1 | 1 | 1 | 0 | |
| 3 | 1 | 1 | 1 | | 0 | |
| 4 | 1 | 2 | 1 | | 0 | |
| 5 | 1 | 3 | 1 | | | 1, 0, 0, 0 |
| 6 | 1 | 0 | 1 | 1 | 1 | |
| 7 | 1 | 0 | 1 | | 1 | |
| 8 | 1 | 1 | 1 | 1 | 1 | |
| 9 | 1 | 1 | 1 | | 1 | |
| 10 | 1 | 2 | 1 | | 1 | |
| 11 | 1 | 3 | 1 | | 1 | |
| 12 | 1 | 0 | 1 | 1 | 0 | |
| 13 | 1 | 0 | 1 | | 0 | |
| 14 | 1 | 1 | 1 | 1 | 0 | |
| 15 | 1 | 1 | 1 | | 0 | |
| 16 | 1 | 2 | 1 | | 0 | |
| 17 | 1 | 3 | 1 | | | 0, 1, 0, 0 |
| 18 | 1 | 0 | 1 | 1 | 1 | |
| 19 | 1 | 0 | 1 | | 1 | |
| 20 | 1 | 1 | 1 | 1 | 1 | |
| 21 | 1 | 1 | 1 | | 1 | |
| 22 | 1 | 2 | 1 | | 1 | |
| 23 | 1 | 3 | 1 | | 1 | |
| 24 | 1 | 0 | 1 | 1 | 0 | |
| 25 | 1 | 0 | 1 | | 0 | |
| 26 | 1 | 1 | 1 | 1 | 0 | |
| 27 | 1 | 1 | 1 | | 0 | |
| 28 | 1 | 2 | 1 | | 0 | |
| 29 | 1 | 3 | 1 | | | 0, 0, 1, 0 |
| 30 | 1 | 0 | 1 | 1 | 1 | |
| 31 | 1 | 0 | 1 | | 1 | |
| 32 | 1 | 1 | 1 | 1 | 1 | |
| 33 | 1 | 1 | 1 | | 1 | |
| 34 | 1 | 2 | 1 | | 1 | |
| 35 | 1 | 3 | 1 | | 1 | |
| 36 | 1 | 0 | 1 | 1 | 0 | |
| 37 | 1 | 0 | 1 | | 0 | |
| 38 | 1 | 1 | 1 | 1 | 0 | |
| 39 | 1 | 1 | 1 | | 0 | |
| 40 | 1 | 2 | 1 | | 0 | |
| 41 | 1 | 3 | 1 | | | 0, 0, 0, 1 |
| 42 | 1 | 0 | 1 | 1 | 1 | |
| 43 | 1 | 0 | 1 | | 1 | |
| 44 | 1 | 1 | 1 | 1 | 1 | |
| 45 | 1 | 1 | 1 | | 1 | |
| 46 | 1 | 2 | 1 | | 1 | |
| 47 | 1 | 3 | 1 | | 1 | |
| 48 | 2 | 0, 1 | 1 | 1 | 1 | |
| 49 | 2 | 0, 1 | 1 | | 1 | |
| 50 | 2 | 2, 3 | 1 | | 1 | |
| 51 | 2 | 0, 2 | 1 | | 1 | 1, 1, 0, 0 |
| 52 | 2 | 0, 1 | 1 | 1 | 0 | |
| 53 | 2 | 0, 1 | 1 | | 0 | |
| 54 | 2 | 2, 3 | 1 | | 0 | |
| 55 | 2 | 0, 2 | 1 | | 0 | |

TABLE 8-continued

Index comparison table for joint notification
of DMRS port information and SRI indication

| Value | layers | DMRS port(s) | DMRS symbols | CDM group for data | Scrambling ID | SRI |
|---|---|---|---|---|---|---|
| 56 | 2 | 0, 1 | 1 | 1 | 1 | |
| 57 | 2 | 0, 1 | 1 | | 1 | |
| 58 | 2 | 2, 3 | 1 | | 1 | |
| 59 | 2 | 0, 2 | 1 | | 1 | 1, 0, 1, 0 |
| 60 | 2 | 0, 1 | 1 | 1 | 0 | |
| 61 | 2 | 0, 1 | 1 | | 0 | |
| 62 | 2 | 2, 3 | 1 | | 0 | |
| 63 | 2 | 0, 2 | 1 | | 0 | |
| 64 | 2 | 0, 1 | 1 | 1 | 1 | |
| 65 | 2 | 0, 1 | 1 | | 1 | |
| 66 | 2 | 2, 3 | 1 | | 1 | |
| 67 | 2 | 0, 2 | 1 | | 1 | 1, 0, 0, 1 |
| 68 | 2 | 0, 1 | 1 | 1 | 0 | |
| 69 | 2 | 0, 1 | 1 | | 0 | |
| 70 | 2 | 2, 3 | 1 | | 0 | |
| 71 | 2 | 0, 2 | 1 | | 0 | |
| 72 | 2 | 0, 1 | 1 | 1 | 1 | |
| 73 | 2 | 0, 1 | 1 | | 1 | |
| 74 | 2 | 2, 3 | 1 | | 1 | |
| 75 | 2 | 0, 2 | 1 | | 1 | 0, 1, 1, 0 |
| 76 | 2 | 0, 1 | 1 | 1 | 0 | |
| 77 | 2 | 0, 1 | 1 | | 0 | |
| 78 | 2 | 2, 3 | 1 | | 0 | |
| 79 | 2 | 0, 2 | 1 | | 0 | |
| 80 | 2 | 0, 1 | 1 | 1 | 1 | |
| 81 | 2 | 0, 1 | 1 | | 1 | |
| 82 | 2 | 2, 3 | 1 | | 1 | |
| 83 | 2 | 0, 2 | 1 | | 1 | 0, 1, 0, 1 |
| 84 | 2 | 0, 1 | 1 | 1 | 0 | |
| 85 | 2 | 0, 1 | 1 | | 0 | |
| 86 | 2 | 2, 3 | 1 | | 0 | |
| 87 | 2 | 0, 2 | 1 | | 0 | |
| 88 | 2 | 0, 1 | 1 | 1 | 1 | |
| 89 | 2 | 0, 1 | 1 | | 1 | |
| 90 | 2 | 2, 3 | 1 | | 1 | |
| 91 | 2 | 0, 2 | 1 | | 1 | 0, 0, 1, 1 |
| 92 | 2 | 0, 1 | 1 | 1 | 0 | |
| 93 | 2 | 0, 1 | 1 | | 0 | |
| 94 | 2 | 2, 3 | 1 | | 0 | |
| 95 | 2 | 0, 2 | 1 | | 0 | |
| 96 | 3 | 0-2 | 1 | | 0 | 1, 1, 1, 0 |
| 97 | 3 | 0-2 | 1 | | 0 | 0, 1, 1, 1 |
| 98 | 3 | 0-2 | 1 | | 0 | 1, 0, 1, 1 |
| 99 | 3 | 0-2 | 1 | | 0 | 1, 1, 0, 1 |
| 100 | 4 | 0-3 | 1 | | 0 | 1, 1, 1, 1 |

Similar to Embodiment 2, which DMRS port corresponds to the PTRS port may need to be notified by the base station. In order to save the DCI overhead, the DMRS, the PTRS port information, and the SRI indication may be jointly notified. That is, the indication information of DMRS, PTRS, and SRI is put in a table for joint notification, and each index represents the joint information. But in this case, the table is particularly large and has poor readability. In consideration of the case of front-loaded DMRS with 2 symbols and DMRS type 2, the joint indication may be implemented for thousands of lines.

Another method is to only jointly notify the indication of the SRI and the port correspondence indication information of the PTRS. As shown in Table 9, each index indicates the SRI information and also indicates which SRI corresponds to the PTRS port. For example, index 19 indicates that SRS resource 3 corresponds to the PTRS port, that is, SRS resource 3 has a same precoding as PTRS. That is, the DMRS port corresponding to the SRS resource 3 corresponds to the PTRS. PTRS port 1st, 2nd, 3rd, and 4th respectively represent the first, second, third, and fourth SRS resources in the SRI instruction (remove an SRS resource indicated by 0).

TABLE 9

Index comparison table for joint notification
of SRI and PTRS port information

| SRI | SRI | PTRS port |
|---|---|---|
| 0 | 1, 0, 0, 0 | |
| 1 | 0, 1, 0, 0 | |
| 2 | 0, 0, 1, 0 | |
| 3 | 0, 0, 0, 1 | |
| 4 | 1, 1, 0, 0 | |
| 5 | 1, 0, 1, 0 | |
| 6 | 1, 0, 0, 1 | |
| 7 | 0, 1, 1, 0 | |
| 8 | 0, 1, 0, 1 | 1st |
| 9 | 0, 0, 1, 1 | |
| 10 | 1, 1, 1, 0 | |
| 11 | 0, 1, 1, 1 | |
| 12 | 1, 0, 1, 1 | |
| 13 | 1, 1, 0, 1 | |
| 14 | 1, 1, 1, 1 | |
| 15 | 1, 1, 0, 0 | |
| 16 | 1, 0, 1, 0 | |
| 17 | 1, 0, 0, 1 | |
| 18 | 0, 1, 1, 0 | |
| 19 | 0, 1, 0, 1 | 2nd |
| 20 | 0, 0, 1, 1 | |
| 21 | 1, 1, 1, 0 | |
| 22 | 0, 1, 1, 1 | |
| 23 | 1, 0, 1, 1 | |
| 24 | 1, 1, 0, 1 | |
| 25 | 1, 1, 1, 1 | |
| 26 | 1, 1, 1, 0 | |
| 27 | 0, 1, 1, 1 | |
| 28 | 1, 0, 1, 1 | 3rd |
| 29 | 1, 1, 0, 1 | |
| 30 | 1, 1, 1, 1 | |
| 31 | 1, 1, 1, 1 | 4th |

If the SRI and DMRS are separately indicated, it is not necessary to carry the information about the number of DMRS ports in the DMRS port configuration information. In order to save overhead, the port indication of the DMRS is dependent on the indication of the SRI. If the SRI indication includes X SRS resources (X 1s), the indication of the DMRS port only needs to indicate the DMRS information when the number of DMRS ports is X. Assuming that the corresponding information of the PTRS port is not considered, Table 4 should be divided into 4 tables. For example, Table 4-1 is used to notify the DMRS port information that the number of layers is 1, and contains 12 indexes and requires 4 bits. Table 4-2 is used to notify the DMRS port information that the number of layers is 2, and contains 8 indexes and requires 3 bits. Table 4-3 is used to notify the DMRS port information that the number of layers is 3, and contains 1 index and not requires bit. Table 4-4 is used to notify the DMRS port information that the number of layers is 4, and contains 1 index and not requires bit. Since the overhead of DCI must be kept constant, the reserved bits indicated through the DMRS port must be a constant number. Since the DMRS port information indication needs 4 bits at 1-layer, 4 bits need to be reserved in the DCI to notify the DMRS port information. However, this seems to be somewhat wasteful. A method for reducing DCI overhead is that when the number of DMRS ports is less than or equal to S1, the base station reduces the number of indexes indicated by the DMRS port information to below S2 or S2 by using a high layer configuration. For different UEs, the DMRS port information represented by these DMRS port indexes configured by the base station with high layer signaling may be different. For example, S1=1 and S2=8. Then the base station uses high layer signaling to notify the DMRS port information at 1-layer, which is the first eight indexes in Table 4, as shown in Table 10-1. In the end, different DMRS port numbers correspond to different tables, but the total overhead is the same, all are 3 bits.

If the port information of the DMRS and the port corresponding information of the PTRS are jointly notified, when the number of DMRS ports is Fi, the base station uses a high layer configuration to reduce the number of indexes indicated by the DMRS port information to H or below H. For different UEs, the number of H DMRS port indexes or the port information corresponding to the indexes configured by the base station may be different. That is, the base station may limit the number of indexes included in the table corresponding to the number of different DMRS ports to a range by using high layer signaling. For example, for the table 10-1 with more indexes, that is, the 1-layer DMRS transmission correspondence table, the 1-layer DMRS transmission correspondence table may be split into multiple tables according to the reasonably configured bits, and the user just need be notified in advance.

S1, S2, Fi, and H are all positive integers. i=1, 2, 3, or 4.

Generally speaking, the number of DMRS ports is notified by SRI. When the number of DMRS ports belongs to the set A, the first communication node uses higher layer signaling to limit the number of DMRS port information indication indexes to S or less. S is a positive integer, and set A is a subset of the set B of the number of DMRS ports that the user supports. For example, if the uplink supports a maximum of 4 ports, then set B is $\{1, 2, 3, 4\}$ and set A is $\{1\}$. Then the base station uses high layer signaling to limit the corresponding DMRS information indication index at 1-layer to a certain range. That is, the certain range is less than or equal to S. If S=16, the number of bits required is 4. How to limit these indexes? For the case of one DMRS port, multiple tables may be used to indicate the situation when 1 DMRS port exists, and then high layer signaling is used to indicate which table. For the DMRS information indication of other ports, only one table exists. Generally, since the number of DMRS ports is relatively small, the limit is required; the element in A corresponds to the case where the number of DMRS ports is relatively small.

TABLE 10-1

Index comparison table for DMRS transmission at 3 layers

| Value | layers | DMRS port(s) | DMRS symbols | CDM group for data | Scrambling ID | # of CWs |
|---|---|---|---|---|---|---|
| 0 | 1 | 0 | 1 | 1 | 0 | 1 |
| 1 | 1 | 0 | 1 |   | 0 | 1 |
| 2 | 1 | 1 | 1 | 1 | 0 | 1 |
| 3 | 1 | 1 | 1 |   | 0 | 1 |
| 4 | 1 | 2 | 1 |   | 0 | 1 |
| 5 | 1 | 3 | 1 |   | 0 | 1 |
| 6 | 1 | 0 | 1 | 1 | 1 | 1 |
| 7 | 1 | 0 | 1 |   | 1 | 1 |
| 8 | 1 | 1 | 1 | 1 | 1 | 1 |
| 9 | 1 | 1 | 1 |   | 1 | 1 |
| 10 | 1 | 2 | 1 |   | 1 | 1 |
| 11 | 1 | 3 | 1 |   | 1 | 1 |
| 12 | 2 | 0, 1 | 1 | 1 | 0 | 1 |
| 13 | 2 | 0, 1 | 1 |   | 0 | 1 |
| 14 | 2 | 2, 3 | 1 |   | 0 | 1 |
| 15 | 2 | 0, 2 | 1 |   | 0 | 1 |
| 16 | 2 | 0, 1 | 1 | 1 | 1 | 1 |

TABLE 10-1-continued

Index comparison table for DMRS transmission at 3 layers

| Value | layers | DMRS port(s) | DMRS symbols | CDM group for data | Scrambling ID | # of CWs |
|---|---|---|---|---|---|---|
| 17 | 2 | 0, 1 | 1 |   | 1 | 1 |
| 18 | 2 | 2, 3 | 1 |   | 1 | 1 |
| 19 | 2 | 0, 2 | 1 |   | 1 | 1 |
| 20 | 3 | 0-2 | 1 |   | 0 | 1 |
| 21 | 4 | 0-3 | 1 |   | 0 | 1 |

TABLE 10-2

Index comparison table for DMRS transmission at 2 layers

| Value | layers | DMRS port(s) | DMRS symbols | CDM group for data | Scrambling ID | # of CWs |
|---|---|---|---|---|---|---|
| 0 | 2 | 0, 1 | 1 | 1 | 0 | 1 |
| 1 | 2 | 0, 1 | 1 |   | 0 | 1 |
| 2 | 2 | 2, 3 | 1 |   | 0 | 1 |
| 3 | 2 | 0, 2 | 1 |   | 0 | 1 |
| 4 | 2 | 0, 1 | 1 | 1 | 1 | 1 |
| 5 | 2 | 0, 1 | 1 |   | 1 | 1 |
| 6 | 2 | 2, 3 | 1 |   | 1 | 1 |
| 7 | 2 | 0, 2 | 1 |   | 1 | 1 |

TABLE 10-3

Index comparison table for DMRS transmission at 3 layers

| Value | layers | DMRS port(s) | DMRS symbols | CDM group for data | Scrambling ID | # of CWs |
|---|---|---|---|---|---|---|
| 0 | 3 | 0-2 |   |   | 0 | 1 |
| 1 |   |   |   |   |   |   |
| 2 |   |   |   |   |   |   |
| 3 |   |   |   |   |   |   |
| 4 |   |   |   |   |   |   |
| 5 |   |   |   |   |   |   |
| 6 |   |   |   |   |   |   |
| 7 |   |   |   |   |   |   |

TABLE 10-4

Index comparison table for DMRS transmission at 4 layers

| Value | layers | DMRS port(s) | DMRS symbols | CDM group for data | Scrambling ID | # of CWs |
|---|---|---|---|---|---|---|
| 0 | 4 | 0-3 | 1 |   | 0 | 1 |
| 1 |   |   |   |   |   |   |
| 2 |   |   |   |   |   |   |
| 3 |   |   |   |   |   |   |
| 4 |   |   |   |   |   |   |
| 5 |   |   |   |   |   |   |
| 6 |   |   |   |   |   |   |
| 7 |   |   |   |   |   |   |

Embodiment 4

In the above example, the number of SRS resources included in the SRI indication is four. However, in order to be more flexible, more than 4 SRS resources may be configured by using a high layer, and then the SRI indication in DCI is used to select N SRS resources. Since an uplink supports a maximum of 4 layers at maximum, the general SRI indicates that the corresponding number of SRS resources for data transmission does not exceed 4, that is, the number of uplink DMRS ports is not greater than 4.

For example, a base station uses the high layer signaling to configure the user with a total of 8 resources, that is, 4 SRS resource groups, and each resource group contains 2 resources. In order to distinguish whether users can send SRS resources at the same time, the following definitions can be made: users cannot send resources within a resource group at the same time, but can send resources between resource groups at the same time. For example, resource group 0 configured by UE0, that is, SRS_Grp0 contains SRS resources 0 and 1, namely SRS_R0 and SRS_R1; resource group 1, namely SRS_Grp1, contains SRS resources 2 and 3, namely SRS_R2 and SRS_R3; resource group 2, namely SRS_Grp2, contains SRS resources 4 and 5, namely SRS_R4 and SRS_R5; resource group 3, namely SRS_Grp3, contains SRS resources 6 and 7, namely SRS_R6 and SRS_R7.

{SRS_Grp0: [SRS_R0, SRS_R1]
SRS_Grp1: [SRS_R2, SRS_R3]
SRS_Grp2: [SRS_R4, SRS_R5]
SRS_Grp3: [SRS_R6, SRS_R7]}

After the eight SRS resources are configured by the upper layer, the base station uses the SRI indication field in the DCI signaling to notify the user of the N resources to the user.

Generally understanding, an SRI, that is, one SRS resource corresponds to a DMRS port, that is, one layer transmission. Therefore for N-layer transmission, the base station needs to indicate N of the 8 SRS resources, which makes the DCI overhead huge. For example, an 8 bit map is used to notify the SRI.

Since different SRS resources cannot be sent at the same time in an SRS resource group, the SRS resources in the group collectively correspond to a DMRS port. The ID of the SRS resource group allocated in this way (assigned by the DCI after the high layer configuration is completed) may correspond to the assigned DMRS port number one by one. Usually different SRS resources in the group are sent by different beams. The beams in the group are sent by a same antenna panel or a transceiver unit (TXRU). Since the same antenna panel or TXRU cannot send 2 beams at the same time, the 2 beams can only be sent in time sharing, that is, the SRS resources in the group cannot be sent at the same time.

In order to save the DCI signaling overhead, the following provisions may be made: SRS_Grp0 is paired with and the first SRS resource of SRS_Grp1, that is, SRS_R0 and SRS_R2 are paired into an SRS resource pair, that is, SRS_RP0 contains SRS_R0 and SRS_R2; SRS_R1 and SRS_R3 are paired into a pair, that is, SRS_RP1 contains SRS_R1 and SRS_R3; SRS_R4 and SRS_R6 are paired into a pair, that is, SRS_RP2; and SRS_R5 and SRS_R7 are paired into a pair, that is, SRS_RP3. Paired SRS resources usually correspond to a same beam and different polarization directions. The 8 SRS resources configured in this way come from 4 different beams.

In this way, for users of 2-layer data transmission, that is, 2-port DMRS allocation, for simplicity, it can be assumed that 2-layer data transmission must come from different polarization directions of a beam, that is, 2 DMRS ports must come from an SRS resource pair. In this way, only four status bits are needed to select a resource pair from the four SRS resource pairs. In other words, the flexibility of scheduling is limited, that is, 2-layer data transmission cannot come from different SRS resource pairs.

For a 4-layer data transmission, different polarization directions from 2 beams are necessary, that is, four DMRS ports must come from four SRS resources of two SRS resource pairs, and the two SRS resource pairs belong to different resource groups. Since SRS of a same resource group cannot be transmitted at the same time. In this way, 4 cases exist to configure 4-layer transmission, namely (1) SRS_R0, SRS_R2, SRS_R4, SRS_R6; (2) SRS_R0, SRS_R2, SRS_R5, SRS_R7; (4) SRS_R1, SRS_R3, SRS_R4, SRS_R6; (1), SRS_R3, SRS_R5, SRS_R7. In this way, only four status bits are needed to select two resource pair from the four SRS resource pairs. This limits the flexibility of scheduling but brings compression of signaling overhead.

For 3-layer data transmission, the first two DMRS ports come from different polarization directions of a same beam, that is, the two DMRS ports must come from one SRS resource pair, and the remaining third DMRS port comes from another resource pair or one resource group, and the SRS resource group corresponding to the third DMRS port is different from the SRS resource group occupied by the first two DMRS ports. In a first step, a resource pair needs to be selected from the four SRS resource pairs and be allocated to the first two DMRS ports. Since one SRS resource pair occupies 2 SRS resource groups, in the second step, one of the 4 SRS resources in the remaining 2 SRS resource groups needs to be selected for the third DMRS port. This requires a total of 4 by 4=16 status bits. Or, in the correspondence between the configured SRS resource and the DMRS port, a first DMRS port and a second DMRS port in 3-layer data transmission correspond to SRS resources from a same SRS resource pair, a third DMRS port corresponds to an SRS resource in another resource pair, and an SRS resource group corresponding to the third DMRS port is different from an SRS resource group occupied by occupied by the first two DMRS ports. The first DMRS port and the second DMRS port mentioned here refer to two of the three DMRS ports, and may not necessarily be the first two of the DMRS ports in order. Similarly, the third DMRS port refers to the remaining ports except the first port and the second port. For example, the first DMRS and second DMRS ports refer to DMRS port 1 and DMRS port 3, and the third DMRS port refers to DMRS port 2.

For 1-layer transmission, one of the eight SRS resources configured needs to be selected, and eight status bits are required.

Therefore, to synthesize 1-layer, 2-layer, 3-layer and 4-layer transmissions, a total of 4+4+16+8=32 status bits is required, that is, 5 bits is sufficient. Compared with the resource configuration of 4 SRSs, the number of configurable beams is increased, but the overhead is only increased by 1 bit.

In an embodiment, there is no need to configure four SRS resource groups, but to configure two SRS groups. Then SRS_R0 and SRS_R1 are configured as a pair, SRS_RP0, that is, different polarization directions from a same beam; SRS_R2 and SRS_R3 are configured as a pair, SRS_RP1; SRS_R4 and SRS_R5 are configured as a pair, SRS_RP2; and SRS_R6 and SRS_R7 are configured as a pair, SRS_RP3.

{SRS_Grp0: SRS_R0, SRS_R1, SRS_R2, SRS_R3
SRS_Grp1: SRS_R4, SRS_R5, SRS_R6, SRS_R7}

In this way, for an SRS resource group, different SRS resource pairs cannot be sent at the same time, but different resources of a same resource pair can be sent at the same time. SRS resources of different resource groups can be sent simultaneously. This is similar to a case of being divided into 4 groups. That is, for 2-layer data transmission, 2 DMRS ports must come from one SRS resource pair; for 3-layer data transmission, 2 DMRS ports must come from one SRS resource pair, and the remaining 1 DMRS port comes from another SRS resource in one resource group, and the SRS resource group corresponding to the third DMRS port is different from the SRS resource group occupied by the first two DMRS ports. For a 4-layer transmission, four DMRS ports must come from two SRS resource pairs, and the two SRS resource pairs belong to different resource groups.

Therefore, it can be seen from the above example that, for some layers, when the base station notifies the SRS, it is sufficient to notify the ID of the resource pair. It is not necessary to notify the resource ID, which can save DCI overhead. In an embodiment, for certain layers, the base station notifies the ID of the resource group of the SRS.

The method of notifying only the resource pair ID may be implemented implicitly, for example, only the sequence number of the first resource in each resource pair is notified instead of the ID of the resource pair. Both are equivalent.

The first communication node described herein generally refers to a base station, and the second communication node generally refers to a user terminal. Of course, other things are not excluded, for example, the first communication node generally refers to a user, and the second communication node generally refers to a user, so that the method can be applied to device-to-device communication (D2D).

The ports p0-p11 described in the disclosure are all integers, and are not necessarily continuous integers. For example, p0-p11 may actually represent ports 1000-1011.

The concept of resource pair and resource group referred to in this article is different. The SRS resources in different SRS resource groups may be sent at the same time, and resources in a same resource pair may be sent at the same time.

It should be understood by those skilled in the art that all or some steps in the methods described above may be implemented by relevant hardware as instructed by programs, and the programs may be stored in a computer-readable storage medium, such as a read-only memory, a magnetic disk, an optical disk or the like. In an embodiment, all or some steps in the embodiments described above may also be implemented by using one or more integrated circuits. Accordingly, the multiple modules/units in the above embodiments may be implemented by hardware or by a software functional module. The present disclosure is not limited to any specific combination of hardware and software.

The above are only embodiments of the present disclosure and are not intended to limit the present disclosure.

What is claimed is:

1. A signaling transmission method, comprising:
configuring a plurality of sounding reference signal (SRS) resources to a user equipment (UE), and indicate N resources from the plurality of SRS resources, wherein each of the N resources corresponds to one demodulated reference signal (DMRS) port;
dividing the plurality of SRS resources into a plurality of SRS resource pairs,
wherein N=3,
wherein a first DMRS port and a second DMRS port in 3-layer data transmission correspond to SRS resources from a same SRS resource pair, a third DMRS port corresponds to an SRS resource in a SRS resource pair other than the SRS resource pair corresponding to the first DMRS port and the second DMRS port, and an SRS resource group corresponding to the third DMRS port is different from an SRS resource group occupied by the first DMRS port and the second DMRS port,
wherein SRS resources within a same SRS resource group are transmitted non-simultaneously, and SRS resources of different SRS resource groups are transmitted simultaneously or non-simultaneously.

2. The signaling transmission method of claim 1, wherein N=2, wherein two DMRS ports in 2-layer data transmission correspond to SRS resources of a same SRS resource pair.

3. The method of claim 1, wherein N=4,
wherein four DMRS ports for 4-layer data transmission correspond to SRS resources from two different SRS resource pairs, and the two SRS resource pairs belong to different resource groups,
wherein SRS resources within a same SRS resource group are transmitted non-simultaneously, and SRS resources of different SRS resource groups are transmitted simultaneously or non-simultaneously.

4. A device, comprising:
a processor; and
a memory for storing instructions executable by the processor,
wherein when executing the instructions, the processor is configured to execute the signaling transmission method of claim 1.

5. A non-transitory computer readable storage medium, which is configured to store computer executable instructions for executing the signaling transmission method of claim 1.

* * * * *